(12) United States Patent
Hansen

(10) Patent No.: US 9,011,680 B2
(45) Date of Patent: Apr. 21, 2015

(54) OIL BOOM

(75) Inventor: Terje Olav Hansen, Stronstad (NO)

(73) Assignee: Norlense AS, Stronstad (NO)

( * ) Notice: Subject to any disclaimer, the term of this patent is extended or adjusted under 35 U.S.C. 154(b) by 496 days.

(21) Appl. No.: 13/497,865

(22) PCT Filed: Sep. 24, 2010

(86) PCT No.: PCT/NO2010/000350
§ 371 (c)(1),
(2), (4) Date: Sep. 28, 2012

(87) PCT Pub. No.: WO2011/037479
PCT Pub. Date: Mar. 31, 2011

(65) Prior Publication Data
US 2013/0015112 A1  Jan. 17, 2013

(30) Foreign Application Priority Data

Sep. 24, 2009 (SE) ............................... 20093049

(51) Int. Cl.
  *E02B 15/04* (2006.01)
  *E02B 15/08* (2006.01)
  *E02B 15/06* (2006.01)

(52) U.S. Cl.
  CPC ............ *E02B 15/0842* (2013.01); *E02B 15/06* (2013.01); *E02B 15/0814* (2013.01); *Y10S 210/923* (2013.01)

(58) Field of Classification Search
  CPC ... E02B 15/047; E02B 15/06; E02B 15/0814; E02B 15/0842; E02B 15/10; C02F 2103/007
  USPC ............ 210/170.05, 170.09, 170.11, 242.3, 210/923, DIG. 5; 405/63
  See application file for complete search history.

(56) References Cited

U.S. PATENT DOCUMENTS

| 3,667,608 A | * | 6/1972 | Burroughs et al. | ......... 210/242.4 |
| 3,771,662 A |   | 11/1973 | Muramatsu et al. | |
| 3,779,382 A | * | 12/1973 | Steltner | ...................... 210/242.3 |
| 3,810,832 A | * | 5/1974 | Rhodes | ..................... 210/DIG. 5 |
| 3,850,807 A | * | 11/1974 | Jones | ...................... 210/170.05 |
| 3,966,614 A | * | 6/1976 | Ayers | ......................... 210/242.3 |
| 4,197,204 A | * | 4/1980 | Mathes | ...................... 210/242.3 |
| 5,200,066 A |   | 4/1993 | Jorgensen | |
| 5,531,890 A | * | 7/1996 | Keenan | ...................... 210/242.3 |

FOREIGN PATENT DOCUMENTS

| DE | 37 07 285 | 9/1988 |
| GB | 2 229 936 | 10/1990 |
| WO | WO 82/02912 | 9/1982 |
| WO | WO 03/071035 | 8/2003 |

* cited by examiner

*Primary Examiner* — Christopher Upton
(74) *Attorney, Agent, or Firm* — Ladas & Parry LLP

(57) ABSTRACT

Oil boom (1) having an elongated buoyancy body (8) carrying a skirt (9) that is hanging down in the sea as a barrier against water surface pollution. The boom (1) is arranged for being towed by its ends, in a U shape, for collecting pollution, in particular mechanically dispersed oil. The boom is designed in such a way that conditions for concentrating the pollution arise in the inner area of the boom, and in that at least parts of said inner area are provided with a means (6, 10) for coalescence of pollution drops.

8 Claims, 3 Drawing Sheets

OIL BOOM

This application is a 371 of PCT/NO2010/000350, filed on Sep. 24, 2010, which claims priority to Norwegian patent application number 2009-3049, filed Sep. 24, 2009, which is incorporated herein by reference.

THE BACKGROUND

A number of different methods for collecting oil from a water surface are previously known. Most commonly is a boom launched and a separate skimmer used for the removal of oil being collected in the rearmost part of the boom. The drawback with this type of booms is that they cannot be towed forward at high speed, as the oil will be drawn into the water underneath the boom. Another drawback with booms of prior art is that the skimmer for collecting the oil on the water surface often collects a lot of water, and occasionally also a lot of air, at the same time. The oil concentration is simply too low and the sea too rough, so that the skimmer intake from time to time is above the sea surface.

Most prior art booms are designed for concentrating and collecting oil spill at the sea surface, that is oil which substantially is not mixed into water and is floating on the surface as a slick. Examples of such booms adapted for removing oil spill at a high relative speed, is the Ocean Buster by NOFI and the Active Oil Trawl by Norlense. These booms only collect oil on the surface in fairly calm weather and at wind generated waves less than 2.5-3 meters height. The applicable parameter in this context is the sum of the relative towing speed and the orbital water velocity of the waves. Patent documents WO 8202912 and U.S. Pat. No. 5,200,066 describe two booms for collecting oil spill at the sea surface, both comprising means for creating a vortex motion in the water in order to concentrate the oil before it is collected.

Experience does however indicate that mechanical dispersion of the oil slick (the dispersion into oil drops) starts already at a water current speed exceeding 0.5 m/s (1 knot) relative to the oil, or when the waves break. There is thus a reason to assume that there will be certain concentration of oil dispersed at the water surface even at a moderate breeze, and that said dispersion will increase with increasing wave height. For more information, see for example Gerald A. L. Delvigne: Natural dispersion of Oil by Different Sources of Turbulence", Joint Oil Spill Conf. 1993, pp 415-419. Experience further shows that substantially all the oil will be disintegrated to drops (natural dispersion) at wave heights over 3 m, thereby making attempts to collect oil by using booms of today almost pointless.

OBJECT

The main object of the present invention is to provide a boom capable of concentrating and transferring pollution on the upper water to an external unit, during all weather and water current conditions. A further object is that the boom should be designed in a way making it easy to be towed in the water. An additional object is that the boom should be suited for a rapid transportation to the site of use, and further for a rapid unpacking and launching, and subsequently removal, by a minimal number of persons.

The boom according to the present invention is designed as a conventional oil boom, thereby having a tubular floating body and a skirt fastened to its lower rim. The boom should have a given extension and be adapted for being towed in the traditional way by at least one vessel. Further it should be made of a soft, self-inflatable material so as to be rolled on a drum for storing and launching. In a particularly preferred embodiment is the boom designed corresponding to NO patent 316457, having a horizontal net to be deployed on demand.

The boom according to the present invention is designed for collecting oil at the surface of the water, in particular for removing mechanically dispersed oil, and for concentrating it before a blend of oil and water is pumped onto a following or towing vessel. The boom is thus designed to create conditions in the inner area, resulting in a concentration of the pollution, and in that at least parts of the boom have means for facilitating oil drop coalescence in order to increase the oil fraction. In an alternative embodiment the boom also has flotation means for further increasing the oil concentration.

To increase the fraction of oil being removed from the water, both the inner area of the boom and a possible bottom can be equipped with coalescence elements. These will get the oil drops dispersed in the water, to fuse and thereby give larger drops. The coalescence elements can be any elements suited for the purpose and having a large oleophilic surface. Said elements can be fastened to the boom itself, to its bottom or to a member extending mainly in a transverse direction over parts or the whole boom opening. The member divides the boom in an outer and an inner part and is in the following referred to as a dividing member. Embodiments having elements fastened both to the dividing member and the boom itself is also possible, but it is not preferred to have a solid connection in addition to the fastening of the dividing member, as this would reduce the dynamics and cause risk for tensions that may damage the system. In a particularly preferred embodiment the inner area of the boom has a cover, and coalescence elements may also be fastened to this.

The coalescence elements also have a further function, as they damp the water currents in the inner part of the boom, so as to facilitate natural buoyancy of the oil, and to avoid mechanical remixing of oil and water. The oil layer on the coalescence elements are building up until drops are peeled off due to the buoyancy difference between oil and water, or they are ripped off (flushed) the elements due to the speed of the water, or by element movements. Any element having an oleophilic surface or being given such a surface in the form of a coating (e.g. silicone oil) can be used, and there are many different products on the market, such as polypropylene or polyurethane, which will be known by a person skilled in the art. A preferred element is, however, the Split Fiber by Saxa Syntape. Split Fiber is usually made of polypropylene, which is durable, permanently oleophilic and has nearly the same density as water (sinking in oil and just floating in sea water). The product Split Fiber comprises thin strips connected to each other, often in a mesh-like pattern, so that the total surface becomes large.

As mentioned above a preferred embodiment is provided with a cover over parts or the whole inner area of the boom. Said cover is connected to the dividing member and has a density just above that of sea water. The cover damps internal turbulence, waves and currents in the inner area of the boom.

In an advantageous embodiment is the boom, as mentioned above, provided with one or more dividing members extending over parts or the whole of the boom opening, and coalescence elements are fastened to at least parts of said member. The member itself can be one or more ropes fastened across the boom, a mesh-like material extending vertically downward from the water surface, a boom portion having a buoyancy body and a skirt, or the like, or a combination of these. In cases where the dividing member extends just over a portion of the opening of the boom, or where the coalescence elements are not fastened symmetrically on the dividing member, the remaining opening to the inner area of the boom will be asymmetric. The water flowing into the inner area of the boom through this asymmetric opening will thus flow to the end of the boom and then upwardly into a pocket. A horizontal vortex water motion will therefore arise, and this motion will under given circumstances facilitate a separation between oil and water.

Embodiments having the coalescence elements fastened symmetrically to the dividing member are also possible, in which case two separate vortex motions will arise, giving subsequently separations. Smaller temporary vortexes in the system will also contribute to the concentration of oil drops and bring them in touch with each other, so that they merge to larger drops (coalescence). In embodiments where the dividing member has a vertical part with an impermeable skirt part, water flowing under the skirt of said dividing member will generate vertical vortexes and an impasse behind said skirt. These vortexes may lead to an increase of the separation because oil drops following them are brought to contact with the coalescence elements and to the surface.

The dividing member should be fastened to the boom in a way allowing said member to be deployed upon demand. When not deployed it is stored (hinged passively) along a leg of the boom, the remaining part of the boom will act as a conventional oil boom. In the deployed condition the dividing member will cover parts of or the whole, boom opening, and bring the coalescence elements to their desired position in the boom, and in addition a vortex motion will be established in the water flowing into the inner area of the boom. To ensure that the dividing member remains in its correct position despite a strong water current, it is advisable to moor it to the boom leg opposite to the one it is fastened. This may be solved in different ways, which will be obvious to a person skilled of the art. In a preferred embodiment the dividing member extends over the entire boom, and coalescence elements are fastened along the full length of said member, so that all the water entering the boom has to pass said elements.

The coalescence elements are preferably fibres or bands of a length giving a contact period of at least 2 seconds between the water containing the oil drops and said elements, and it is important that these coalescence elements are following the flow directions of the water. This is obtained by fastening them only in the end towards the dividing member. In cases where said member has a vertical extension, the elements may be fastened at different heights. In some cases there might be a risk that the elements tangle up in each other so that the water flow through the elements and the contact between said oil containing water and the coalescence elements are reduced. Thus, it may be an advantage to arrange several transverse members after the dividing member and to span the elements between these. These additional transverse members are not necessarily fastened to a boom leg.

In order to improve the separation further, the boom may have a bottom for establishing two water layers, that is an upper layer being restricted by the boom, and a lower layer which is not affected by the boom. The water restricted by the boom will have a lower flow velocity and a different flow direction than the water flowing freely underneath. The oil in the water flowing under the bottom will not be collected by the boom. The bottom may have many different designs, but is most preferably in the form of a net, or it is made of bands or similar and besides in such a way that it can be launched or removed in the same way as disclosed in the patent NO 316457. In most cases is the bottom (net) arranged only in the inner area of the boom, for instance in such a way that it covers the said interior entirely, and that the water flows over the bottom when is passes the dividing member, or between the dividing member and the boom itself. As said above, it is preferable to fasten coalescence elements to the bottom, in such a way that the elements are evenly distributed in the whole inner area of the boom.

To achieve the best possible separation, it is preferred that the currents in the inner area of the boom are as laminar as possible. Thus, it may be preferable to provide the outer part of the bottom that is the part closest to the entrance to the inner area of the boom, with a net having relatively large mesh width, while the innermost area of the boom is provided with a net having small mesh width. The result is that much of the water which enters the boom will flow out again, while the uppermost part of the water, which contains the largest parts of oil, will flow into the inner part of the boom. This can be done in a number of ways, and one alternative is to provide the dividing member or a part of it with a separate bottom having smaller mesh width than the bottom of the boom itself. In a preferred embodiment of the invention is the bottom of the dividing member also designed to be launched after said member is in position.

The transition to the bottom, i.e. that part of the bottom that separates the water into two layers, will be pressed down when the boom is towed forward. To compensate for this movement the transition is, in commonly known solutions, provided with buoyancy members and the like. In a preferred embodiment of the present invention, is however, the transition hydraulically smooth and made oval with the blunt end pointing forward. This implies that the water is divided into two layers and that the upper part is guided to the inner area of the boom. In another embodiment is the transition further provided with buoys to hold the transition to the bottom at a given level. It is also possible to use pressure sensors which registers changes in pressure, and subsequently alters the transition position. Another solution for keeping the transition at a given level, can be to connect the bottom to a hose, and inflate the hose until it is stiff and hard.

In the inner area of the boom it is preferably arranged at lest one recovery device, to pump a concentrated blend of oil and water and possible air, away from the boom and onto an accompanying vessel. Said recovery device may very well be a traditional skimmer. In a preferred embodiment is said accompanying vessel one of the vessels towing the boom, and in such a situation the hose from the removal device to the accompanying vessel can be within the buoyancy body of the boom. The recovery device should be placed in the region having the largest oil concentration, and in cases where a vortex motion similar to a cyclone arises in the inner area of the boom, the area having the largest oil concentration is near the centre of the vortex motion and especially underneath the water surface. In other alternative versions can the recovery device be integrated with the boom.

To further increase the oil fraction of the oil/water dispersion being removed, the boom and/or the dividing member may have means for providing flotation. A perforated tube may for example be arranged at the lower end of the boom skirt so that air/gas or similar pumped into said tube brings small bubbles out in the water. Oil drops will attach to the bubbles, and rise to the surface. It is also possible to use a gas saturated liquid, as dissolved gas flotation gives a large number of small gas bubbles having a large total surface, which is preferable. The flotation may preferably start early in the boom, which means that the whole boom can be provided with flotation equipment, not only the part making up the inner area of the boom. The bottom and the transition to the bottom may preferably also be provided with flotation equipment.

Another preferred alternative is to use foam for flotation. Foam has an enormously large surface and besides the ability to carry chemicals to increase the attachment of oil drops to the foam surface. Further it may also give a certain dampening effect upon capillary waves. The foam can be released in many ways known to a person skilled of the art, but in a preferred embodiment are nozzles provided on a tube being fastened to the lower end of the skirt of the boom. The tube is filled with surfactant solution being saturated with gas (air, $CO_2$) in similar way as shaving foam in a can, or extinguishing foam.

BRIEF DESCRIPTION OF THE DRAWINGS

The invention is in the following described by an example where the boom is used for collecting mechanically dispersed oil. The example is meant for illustrative purposes only, and should not be interpreted as limiting to the invention. The example is related to the drawings, where.

DETAILED DESCRIPTION OF THE PREFERRED EMBODIMENT

Figure 1:
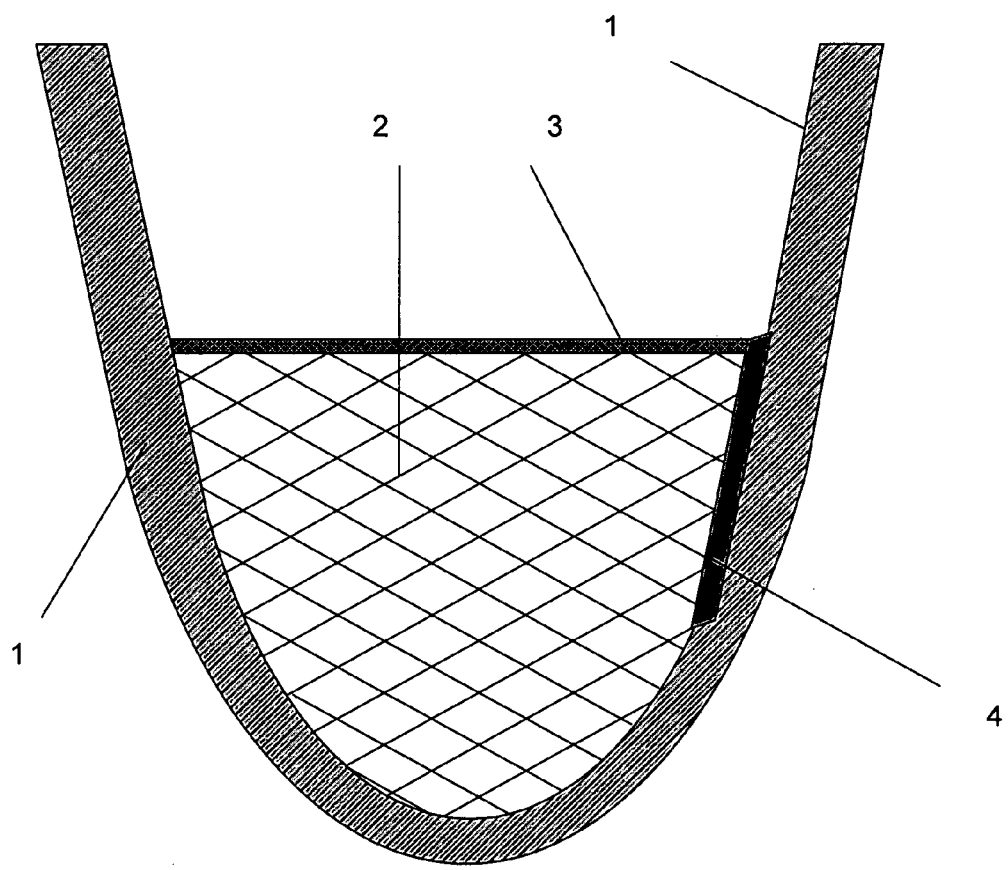
FIG. 1 shows the boom in use and towed by two vessels, before launching of a dividing member.

FIG. 1 shows an oil boom comprising a guiding boom 1 towed behind two vessels (not shown) so that it obtains a U shape. The boom is further provided with a bottom 2, and in the shown case there is a transition 3 to said bottom for avoiding turbulent flow in the inner area of the boom. Along one leg of the guiding boom, is the boom according to the invention further equipped with a dividing member 4. In the embodiment shown in FIG. 1 is the dividing member not yet deployed, and the boom then functions as a conventional oil boom with a bottom.

Figure 2:
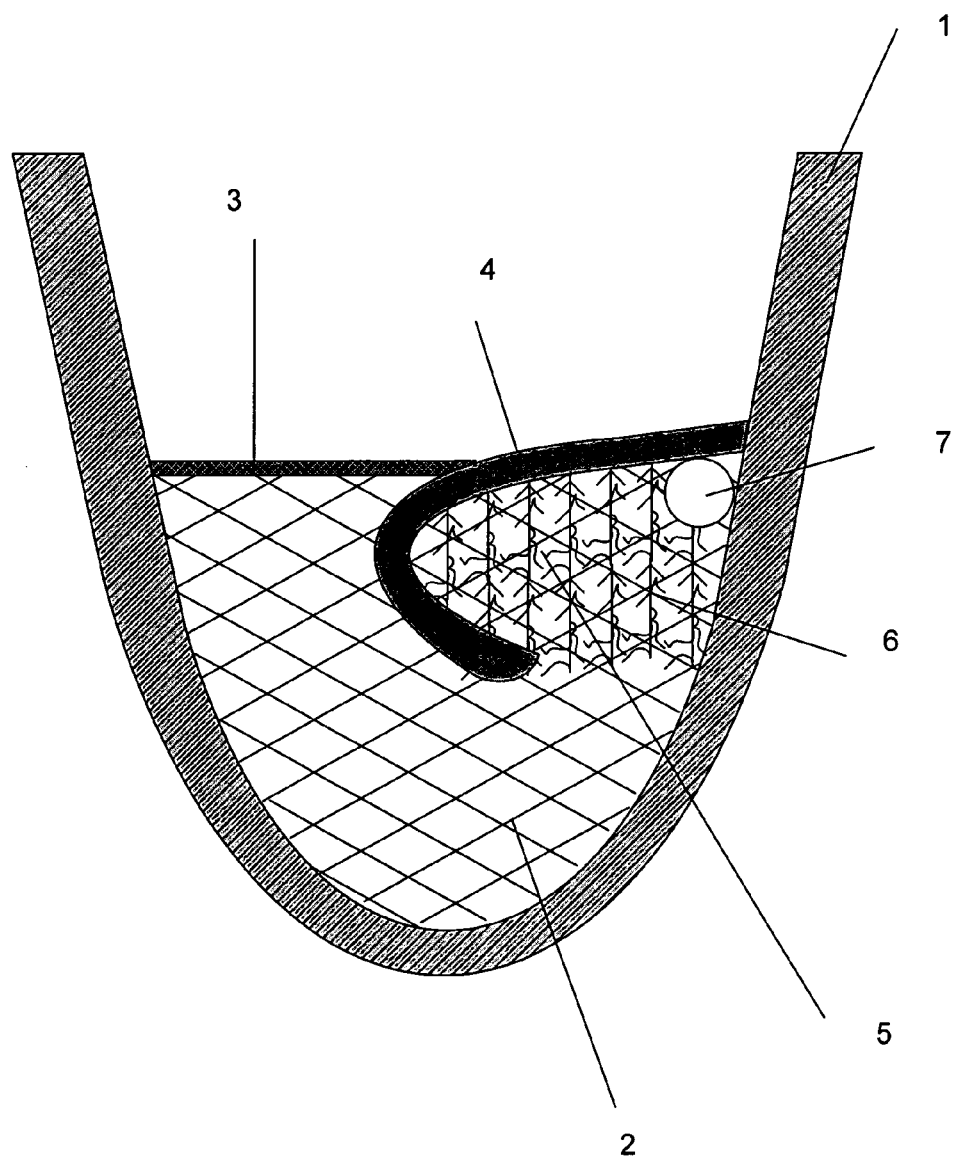
FIG. 2 shows the boom of FIG. 1 after launching of the dividing member.

In FIG. 2 the boom of FIG. 1 is shown with the dividing member 4 deployed. It extends over parts of the boom opening, so that an asymmetric inlet to the inner area of the boom is formed, and further a distance towards the inner area of the boom, so that a pocket 5 is made. A number of coalescence elements 6 are fastened to the dividing member and will thereby fill said pocket. When the vessels tow the guiding boom forward, the water will be separated at the transition 3 in a lower and an upper layer. The upper layer will be guided into the inner area of the boom, and due to the form of the dividing member 4, a vortex motion will arise when the water flows around the end of the dividing member and arrives in the pocket. In the boom part having the greatest oil concentration a removal device 7 is arranged, such as a conventional skimmer.

Figure 3:
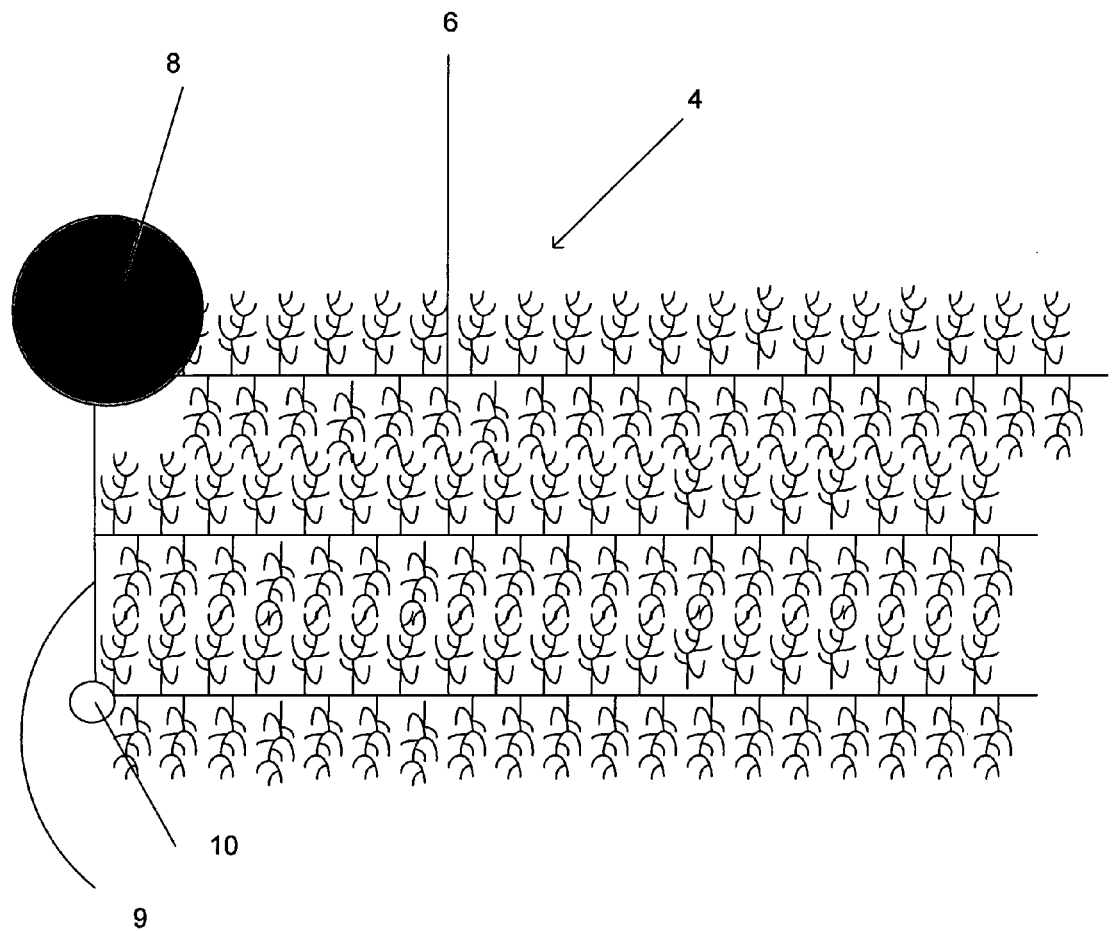
FIG. 3 shows a vertical cross-section of a dividing member in the form of a traditional boom, having coalescence elements.

FIG. 3 shows a vertical cross-section of a dividing member 4 having the form of a traditional boom, but having coalescence elements 6 fastened both to a buoyancy body 8 and to a skirt 9. In the preferred shown embodiment, said coalescence elements 6 have a longitudinal extension and are fastened to the buoyancy body 8 and the skirt in such a way that they will extend behind the buoyancy body/skirt and thereby fill the entire boom pocket. The lower edge of the skirt is further provided with a perforated tube 10 in which a gas can be fed in the cases where flotation is desirable.

The invention claimed is:

1. An oil boom comprising:
   an elongated buoyancy body including a downwardly extending skirt;
   wherein the skirt hangs down into the sea and acts as a barrier against water surface pollution,
   wherein the boom is arranged for being towed by its ends, in a U-shape having an opening, for collecting the water surface pollution;
   wherein a dividing member extends substantially in a transverse direction over the entire boom opening, or parts of said opening;
   wherein a coalescence means is fastened to said dividing member, said coalescence means comprising numerous fibers or bands having an oleophilic surface, one end of said fibers or bands being fastened to said dividing member.

2. The oil boom according to claim 1, wherein the dividing member is provided with a flotation device.

3. The oil boom of according to claim 1, wherein said dividing member is a mesh-like material extending downwardly from the water surface.

4. The oil boom according to claim 1, wherein said fibers or bands are made of polypropylene or polyurethane.

5. The oil boom of claim 1, wherein said fibers or bands are of sufficient length to provide a contact period of at least two seconds with the water containing oil drops.

6. The oil boom according to claim 1, wherein said coalescence means is fastened along the full length of the dividing member.

7. The oil boom according to claim 1, wherein the coalescence means is fastened at different heights to the dividing member.

8. The oil boom according to claim 1, wherein the pollution is mechanically dispersed oil.

\* \* \* \* \*